July 8, 1941.     P. HOLCOMB, JR     2,248,085
LIGHTING CONTROL SYSTEM
Original Filed June 28, 1938    5 Sheets-Sheet 1

INVENTOR
BY Philo Holcomb Jr
E. R. Evans
ATTORNEY

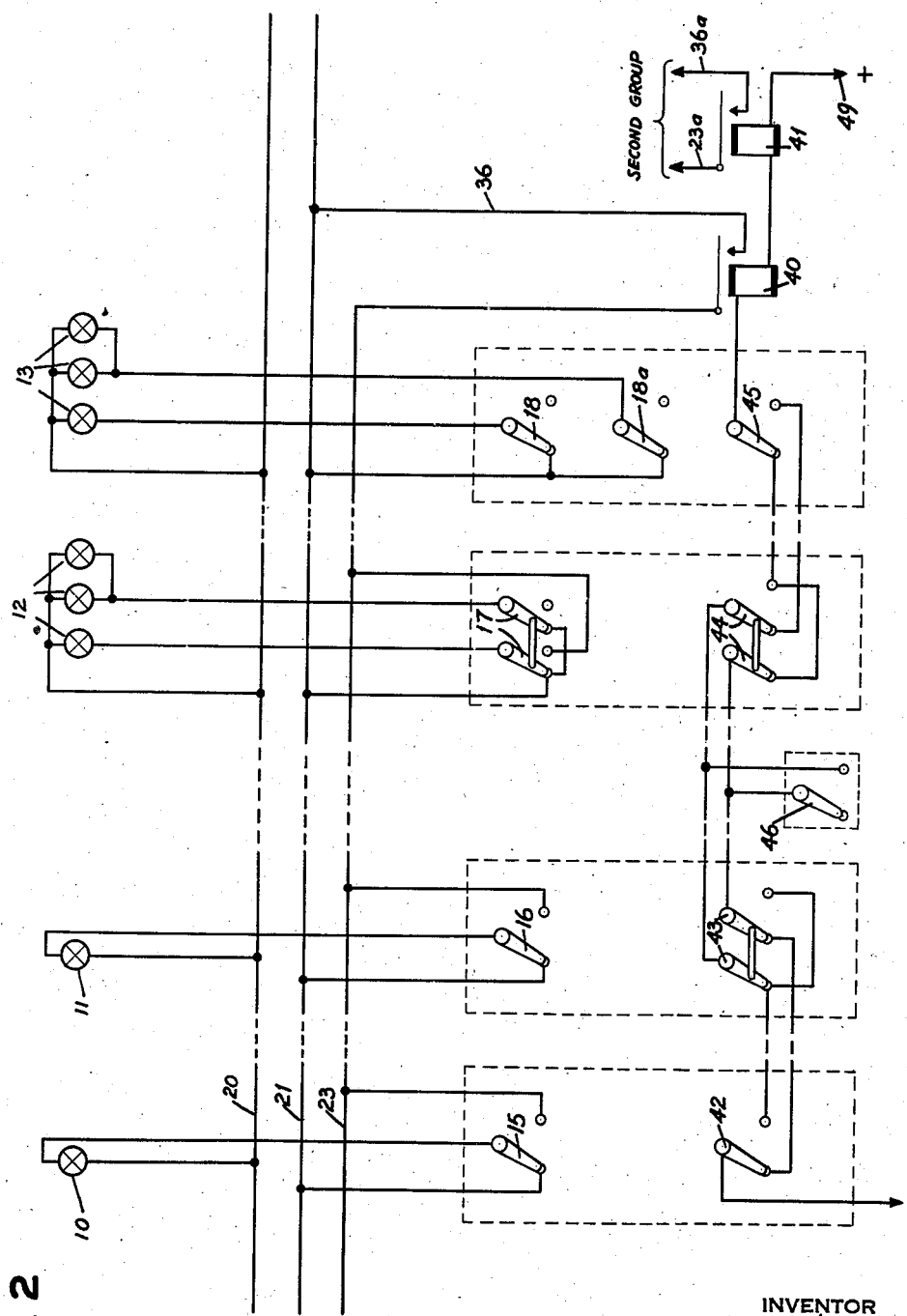

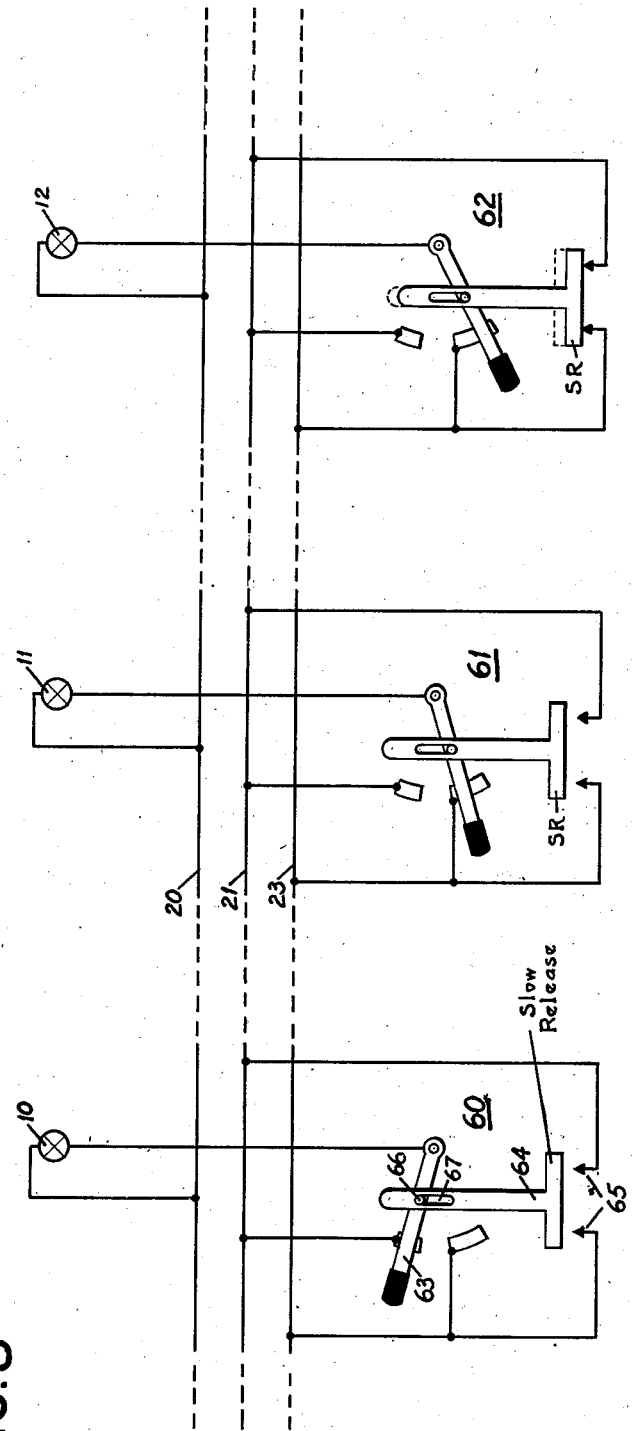

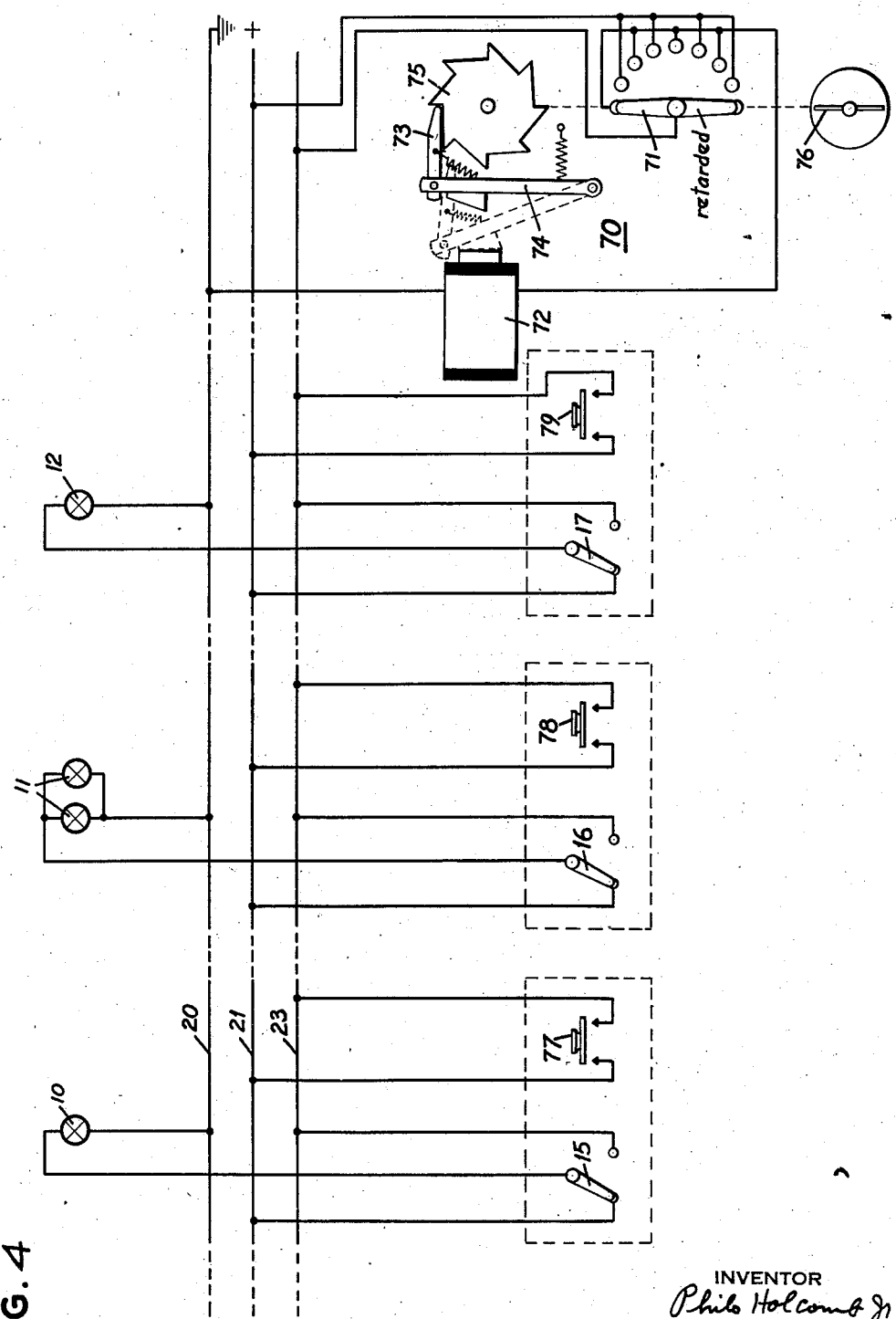

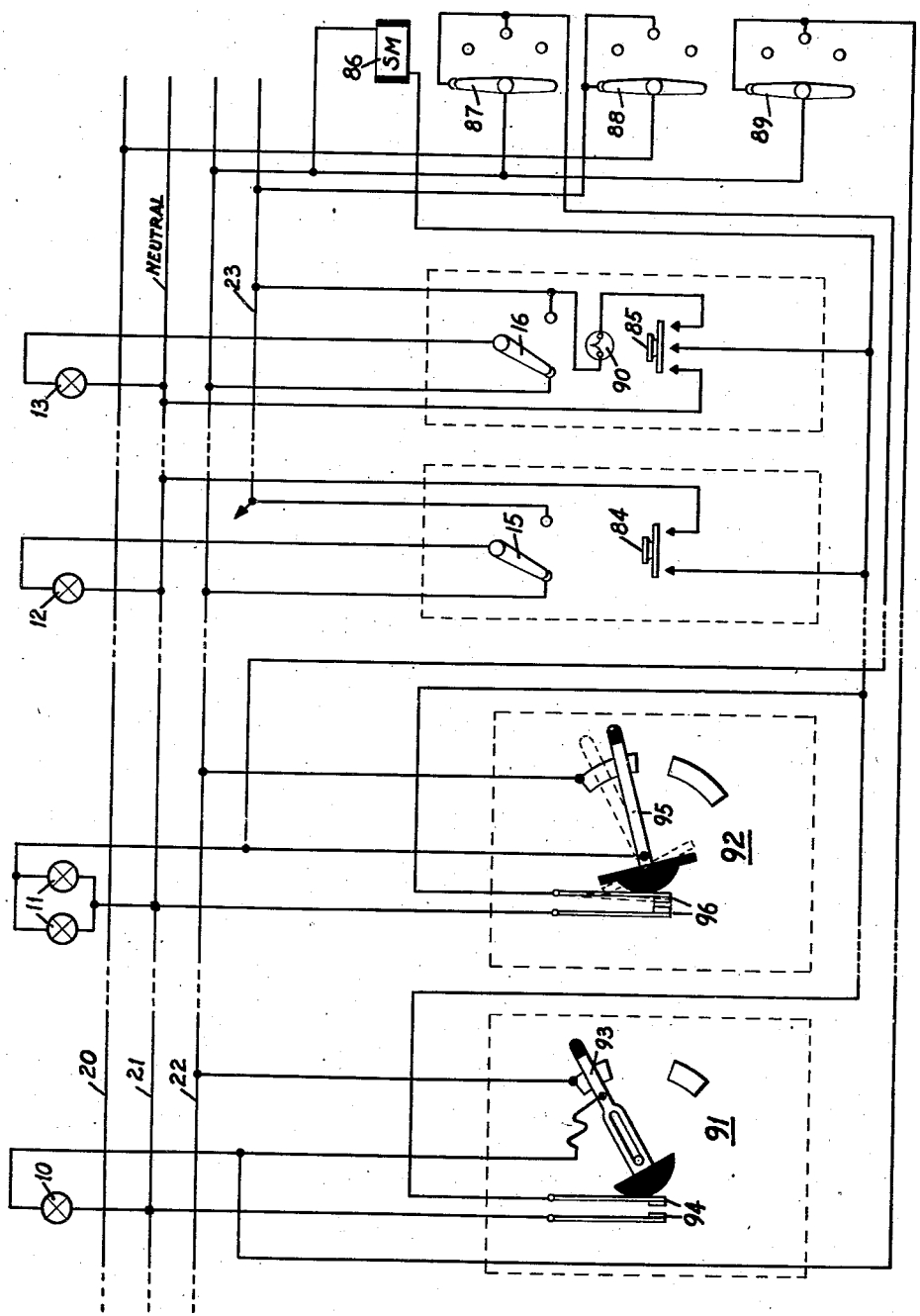

Patented July 8, 1941

2,248,085

UNITED STATES PATENT OFFICE 2,248,085

LIGHTING CONTROL SYSTEM

Philo Holcomb, Jr., Great Neck, N. Y.

Continuation of application Serial No. 216,202, June 28, 1938. This application April 1, 1939, Serial No. 265,480

15 Claims. (Cl. 176—10)

This invention relates to electrical control systems and more particularly to lighting control systems, for example for the lamps in a residence, office, factory or the like.

The present application is a continuation of my prior application, Serial No. 216,202, filed June 28, 1938.

One object of the invention is to provide an improved remote control system for lamps.

Still another object of the invention is to provide a flexible lighting control system whereby the value and usefulness of electric illuminating systems for homes, offices and the like may be enhanced and economies in the consumption of power may be obtained.

In the home it is often desirable to control a number of lamps in different rooms or locations from one control point, or from any one of several points, as for example to flood the house with light in an emergency or for greater convenience. In accordance with the invention a control system is provided enabling a person to turn "on" the lights in several rooms, in the hall and in the stairway, for example when he enters or leaves the house at night, and then extinguish all of the group of lights from the upper hall, porch or other point as convenient, thereby avoiding the necessity of traversing darkened rooms as at present. A system of this character is obviously a great convenience under many circumstances, as it provides for a flexible control of the lights in several rooms or locations which have hitherto been controlled only individually or locally. Frequently this has necessitated traversing darkened rooms or halls to turn the lights "on" and retracing of steps to turn them "off." Furthermore the system provides for group control of selected lights less than the total number in an installation, the other lights being independent of the group control feature.

The system embodying the invention has other uses and advantages. In case of attempted burglary or the presence of prowlers in the grounds surrounding a home, it is often possible to frighten the intruders away, even after entry has been effected, by lighting the rooms and porches of the house. It is obviously desirable to do this quickly from any one of several master control stations, including one located upstairs or far removed from the point at which entry is being effected or attempted. In accordance with the invention, these and other advantages are attained in a simple and effective manner.

Systems embodying the invention are also convenient and useful in factories, office buildings and the like because of the flexible control provided. To cite a single instance, the invention enables the watchman to make efficient use of the electric lights in the building while making his rounds at night. The premises can be flooded with light so as to enhance the effectiveness of his work without requiring him to retrace his steps to turn "off" lights that he has turned "on," which has hitherto prevented a general use of the regular lighting system by the watchman.

Other objects and advantages of the invention will appear from the following description of the preferred embodiments thereof shown on the accompanying drawings, wherein:

Fig. 2 is a similar diagram of a modified system employing a remote-control device, such as an electromagnetic relay for controlling the lights as a group; and Figs. 3–5 are diagrams of further modifications embodying the invention.

Figure 1:
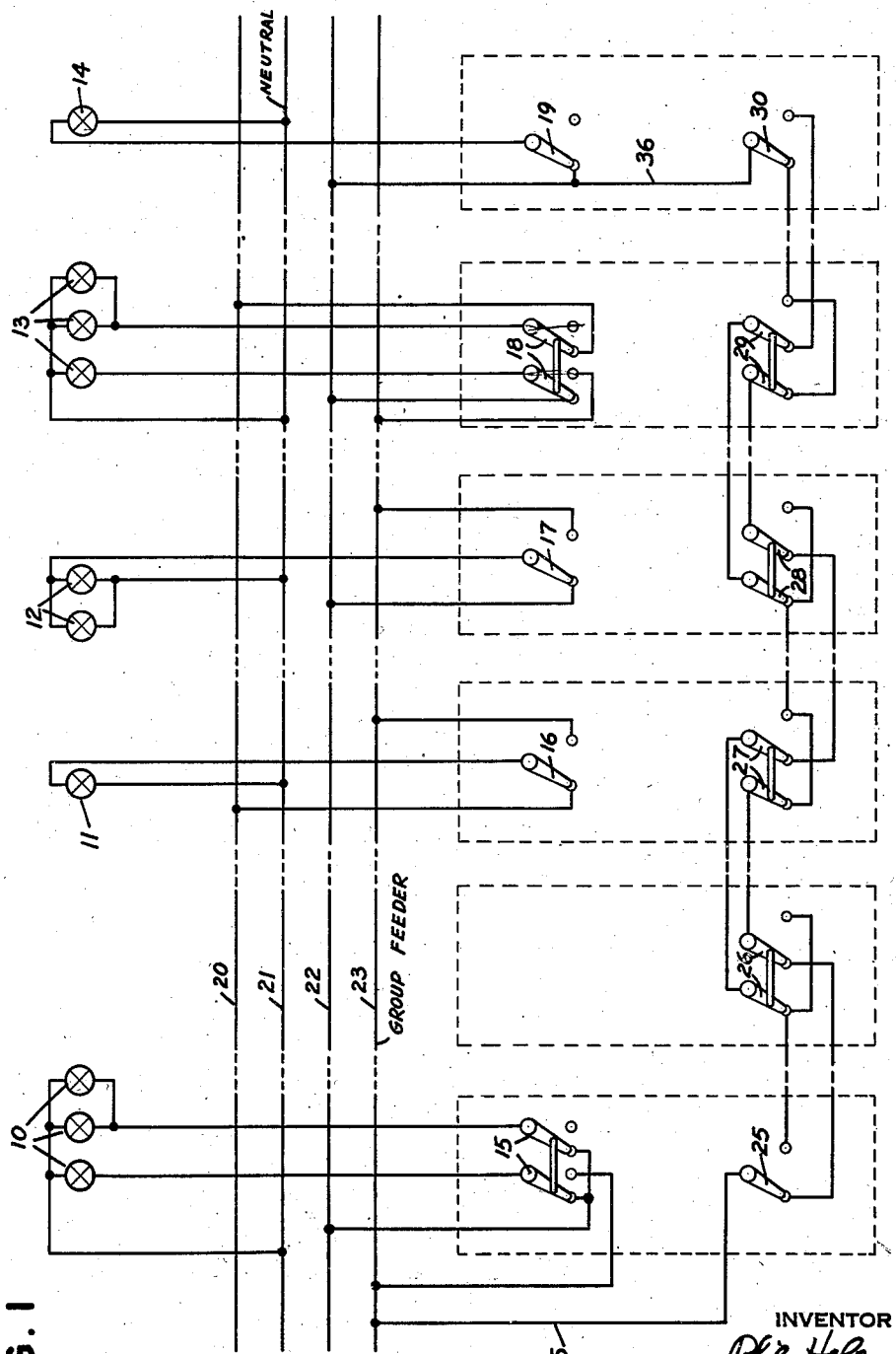
Fig. 1 is a circuit diagram of a lighting control system embodying the invention.

Referring to the drawings, in Fig. 1 the lamps 10, 11, 12, 13 and 14 represent the lights in five separate rooms, for example. These lamps are individually controlled by the switches 15, 16, 17, 18 and 19 in the usual manner. These switches represent the conventional wall switches and are arranged to connect the respective lamps to the conductors of a three-wire supply circuit 20, 21, 22, when the switches are thrown to the left as shown in the drawings. The right-hand contacts of the switches 15 (left hand switch blade), 16, 17 and 18 (left hand switch blade) are connected to a fourth supply conductor or "group feeder" 23 forming a part of the group control circuit, as will be explained.

With this arrangement it will be apparent that when the conductor 23 is "alive," the lamps 10, 11, 12 and 13 which are connected to said conductor by reason of the associated individual control switches being thrown to the right hand or "off" position, will be lighted so that the lights which has been turned "off" at the individual switches may be turned "on" and "off" by energization and deenergization of the conductor 23. It is assumed that it is found desirable that certain of the lamps, represented by the two right hand lamps of the sets or clusters 10 and 13 as well as the lamp 14, be not under the control of the group control means, and therefore these lamps are not connected so as to be energized by the group feeder or conductor 23 when the individual control switches are actuated to the "off" position. Either of the terms "set" or "cluster" is used to describe two or more lamps in one room jointly controlled by a single switch.

In accordance with the invention, master control switches 25, 26, 27, 28, 29 and 30, are provided for group control of the lamps in the various rooms. Each control station is represented by a dotted rectangle on the drawing and as shown certain of the master control switches may be located adjacent individual control switches, for example with the operating levers or push buttons extending through a common face plate, whereas other master control switches represented by the switch 26 may be located in a convenient place removed from any of the individual control switches of the lighting installation. It will be obvious that many different locations of the control switches are possible since any one of the master control switches is arranged to turn the lights "on" and "off" as a group and it is unnecessary to return to a master control switch which has been operated in order to restore the system to a normal condition.

In this embodiment of the invention, a circuit is provided for energizing the group feeder 23 which includes a conductor 35, the contacts of switches 25, 26, 27, 28, 29 and 30 in series, and a conductor 36 connected to one of the supply circuit conductors, for example conductor 22. The master switches are shown as double throw reversing switches so interconnected that when a circuit is established from conductor 35 to conductor 36, the operation of any master switch will open this connection; and conversely when the connection is open between conductors 35 and 36, the operation of any master switch to its alternate position will close the connection to energize the group feeder 23. As shown, the conductor 35 is not connected to conductor 36 and the group feeder 23 is dead although the individual lamps may be turned "on" and "off" by their local switches 15 to 19 in the usual manner. However, if any one of the master control switches 26 to 30 is actuated to the opposite position from that shown, a circuit is closed from the supply conductor 22 through conductor 36, the contacts of the master switches and conductor 35 to the conductor 23 whereupon all of the lamps which have been turned "off" at their local switches are lighted (except the two right hand lamps of the clusters 10 and 13 and the lamp 14 which are independent of the group control feature as described above). It will also be apparent that subsequent operation of any one of the master switches to its alternate position will extinguish the group control lamps by reopening the above-described group control circuit.

It will be apparent that the system shown in Fig. 1 permits convenient control of lamps in separate rooms from any one of several control points without affecting the lights which have been turned "on" by the local control switch in any particular room. Thus a selected number of lamps distributed throughout a premises may be turned "on" and "off" as a group without retracing of steps to extinguish lights which have been turned "on" and permitting lights to be turned "on" in darkened rooms before entering the same. Furthermore, where a set or cluster of lamps is provided in one room as indicated at 10 and 13, only a part of the cluster may be made subject to the group control to decrease the lighting load while the group is turned "on," if desired. In addition, any desired lamps such as those in bedrooms may be made independent of the group control circuit as shown in connection with the lamp 14.

Fig. 2 illustrates a modified system also arranged for combined individual and group control of a plurality of lamps or lighting fixtures in separate locations. The arrangement of the lamps 10, 11, 12 and 13 and of their individual control switches 15, 16, 17 and 18, respectively, is generally similar to the arrangement shown in Fig. 1 except that a two-wire supply circuit 20, 21 is shown by way of example, and the lamps of the cluster 13 may be individually controlled by two separate switches 18 and 18a. These changes are merely exemplary of conventional or typical modifications of lighting circuits well known in the art. This modification of the invention also embodies the group feeder 23 associated with the "off" contacts of the individual control switches 15, 16 and 17 in the same manner as shown in Fig. 1, but in this embodiment of the invention the connection of the group feeder 23 through the conductor 36 to the main supply circuit is controlled by a relay 40. Master control switches 42, 43, 44 and 45, corresponding to switches 25 to 30 in Fig. 1, are provided for controlling the lamps 10 to 13 as a group, but in this instance the master control switches are in circuit with the winding of relay 40 arranged to energize the group feeder 23. It will be apparent from the foregoing description of the master control circuit of Fig. 1 that the switches 42, 43, 44 and 45 permit the relay 40 to be energized and deenergized from any of the master control stations, thereby lighting and extinguishing the lamps which have been turned "off" at their individual control switches. The master control circuit including the winding of relay 40 may also include other control relays such as 41 arranged to close the circuit of other group feeders 23a, etc., to which other lamps may be connected in the same manner as shown in Fig. 1. Control relay 40 or 41 may be responsive to additional switches or circuit-controlling means corresponding to switches 42, 43, 44 and 45. The relay energizing circuit may be energized from a battery 49 as shown or a low voltage step-down transformer, permitting low voltage inexpensive wiring between the master control stations, or the relay circuit may be energized from the main supply circuit conductors 20, 21 if desired. An emergency control switch 46 may also be provided if desired for closing the circuit of the relays 40, 41 in such a manner that the lights cannot be extinguished by the operation of any of the other master control switches. The switch 46 is thrown to the alternate position from that shown to turn the lights "on." With this arrangement it is necessary to restore the switch 46 to the open position in order to extinguish the lights connected to the group control circuit. The emergency switch 46 in this position is novel and permits emergency locking and group control functions by control of the low voltage system.

Another modification of the invention is shown in Fig. 3, wherein a slow-release or time-delay switch 60, 61, 62 is provided at each of the control stations where control of the group of lights is desired (which may be termed "master" control stations). Inasmuch as each of the control stations is identical, a description of the first station and the switch 60 will serve to explain the operation. The lamp 10 may be conencted and disconnected from the supply circuit conductors 20 and 21 by actuating the manually operable switch lever 63, and in the lower or "off" position of said switch lever, one side of the lamp is connected to the group feeder 23 (as indicated at the second station). The switch 60 further comprises a time-delay switch member 64 arranged when operated to bridge contacts 65 to connect the group feeder 23 to the conductor 21, and thereby light all of the lamps which have been turned "off" by the respective switches. The operating lever 63 has a lost-motion connection with the switch member 64, represented by a pin 66 on said lever extending into a slot 67 in the switch member, so that the lever 63 may return to its normal "off" position after depressing the switch member 64. Thus the switch member 64, when depressed as described, remains in engagement with the contacts 65 for a period determined by conventional time-delay mechanism, after which the circuit of the group feeder is opened automatically and the group lights extinguished; on the other hand, the lever 63 may be raised at any time to the position shown to open the group control circuit whenever desired, irrespective of the action of the time-delay mechanism. No retarded restoring mechanism for the switch member 64 is shown, as many arrangements suitable for the purpose are well known, including the ordinary dashpot time-delay mechanism.

Another modification of the invention is shown in Fig. 4, this modification being quite similar to that shown in Fig. 3 except that a single time switch 70 common to all of the control stations serves to extinguish the group of lights automatically after a predetermined lapse of time, as well as to turn the group of lights "on" by remote control from the respective stations. The switch 70 comprises a retarded switch member 71 which is stepped over its associated contacts by an operating magnet 72. An operating pawl 73 carried by the armature 74 of the magnet 72 is adapted to engage a ratchet wheel 75 connected to the non-shorting switch member 71 and to a retarding vane 76 immersed in a viscous fluid. The spacing of the teeth of the ratchet wheel 75 is such that each step of the ratchet mechanism carries the switch member 71 from the starting associated contact over the succeeding contact and into engagement with the next contact of the series. The time required for each complete step of the switch 70 is slightly greater than the predetermined period during which the group of lights is to remain "on."

The arrangement of the lights 10, 11 and 12, their individual control switches 15, 16 and 17, and the group feeder 23 corresponds to that shown in Fig. 2 and described above except that the energization of the feeder 23 is controlled by the switch 70. Master control switches or push buttons 77, 78 and 79 are provided at each of the control stations for operating the switch 70. When any one of the control switches 77, 78 or 79 is closed and then opened, a circuit is closed through said switch and the switch member 71 for energizing the magnet 72. It will be apparent that during the ensuing cycle of operation of the switch 70, a circuit is closed through the second, fourth, sixth or eighth contact thereof, the switch member 71, the group feeder 23 and the right hand contacts of switches 15, 16 and 17 for lighting the lamps 10, 11 and 12. The lamps remain "on" as long as the switch member 71 is in engagement with the said associated contacts and are then turned "off" by the further travel of said switch member.

Another modification of the invention embodying a single remote controlled step-by-step switch is shown in Fig. 5. In this modification the lamps 10, 11, 12 and 13 are energized from a three-wire supply circuit 20, 21, 22 similar to that shown in Fig. 1, and a remote control switch comprising an operating magnet 86 and three switch wipers 87, 88 and 89 is arranged to connect some of the group of lamps to one side and some to the other side of the supply circuit. The lamps 12 and 13 are individually controlled by conventional switches 15 and 16, and at these stations push button master control switches 84 and 85 for controlling the group are also provided. A pilot lamp 90 is also shown at the latter station for indicating whether the group feeder 23 is energized when the master control switch 85 is operated.

If desired, combined master and local control switches 91 and 92 of novel construction may be provided at the control stations. The switch 91 comprises a manually operable switch member 93 which can be rocked about its pivot to make and break the circuit of the lamp 10, and also depressed or actuated lengthwise to close contacts 94 to operate the remote controlled step-by-step switch. The switch 92 embodies a variation of the same arrangement wherein the manually operable switch member 95 for controlling the local circuit, when actuated beyond either of its normal extreme positions, closes the contacts 96 to operate the group feeder switch. It will be apparent that closure of either of the switches 84 or 85, or of the contacts 94 or 96, closes a circuit between the conductors 21 and 22 of the supply circuit including the operating magnet 86 of the remote control switch. The wipers 87, 88 and 89 of said switch in their step-by-step movement alternately connect and disconnect the group from the supply circuit, the group feeder 23 being connected through the switch wiper 88 to one side of the three-wire supply circuit and the lamps 10 and 11 being connected through the switch wipers 89 and 87 respectively, to the other side of the supply circuit when the circuits through the remote control switch are closed.

The switch 91 or 92 shown in Fig. 5 may be utilized if desired in the other embodiments of the invention, for example in Figs. 1 and 2. In this case, the contacts 94 or 96 would be replaced by one of the switches 25—30 or 42—45 and be arranged to alternately move from one position to the other upon successive actuation of the operating member in a manner similar to the operation of the conventional rotary push switch.

It will be evident from the above description of the systems shown in the accompanying drawings that the invention may be utilized in practise with various arrangements of circuits and a great many different types of control switches and other apparatus. In general, the auxiliary apparatus and the circuit employed both depend upon the particular lighting system and arrangement used and the desired functions to be performed by the auxiliary control means. The systems described by way of example illustrate several possibilities in the direction of more flexible control of separated lighting units, including the lighting of all or any selected ones of the units from a plurality of convenient control stations and the extinguishing thereof either manually from any one of several control stations or automatically after a predetermined lapse of time. Furthermore the system may be arranged as shown so as not to affect the lights in occupied rooms or offices where the lamps have been turned "on" by the conventional individual control switches. Other modifications of the circuits and apparatus shown and described above will occur to those skilled in the art and may be made without departing from the scope of the invention as defined in the appended claims.

I claim:

1. An electric control system comprising a supply circuit, a plurality of translating devices, a plurality of separate control switches individual to the respective translating devices and arranged to connect said devices to and disconnect the same from said supply circuit, a plurality of master control switches and means including any of said master control switches for simultaneously controlling the connection of all of said devices in relation to the supply circuit except those which are connected to the supply circuit at the moment by the individual control switches, to successively control operation of two of said master control switches.

2. An electric lighting system comprising a plurality of lamps, switch means for individually controlling said lamps and means including a plurality of other group control switches at separated points for turning "on" and "off" all of said lamps as a group, said last mentioned means being arranged to control the lighting and extinguishing of the lamps of the group which are turned "off" by their individual switch means at any of said points irrespective of the adjustment of any of the other group control switches.

3. An electric lighting system comprising a plurality of lamps for lighting separate rooms or areas, individual control switch means for each of said rooms or areas for lighting and extinguishing said lamps and means including a plurality of master control switches at separated control points for successively lighting and extinguishing certain but not all of the lamps in the system by successive operation of two of said master control switches, said certain lamps including those in a plurality of said rooms or areas controlled separately by said individual control switch means.

4. An electric lighting system comprising a plurality of lamps for lighting separate rooms or areas, individual control switch means for each of said rooms or areas for lighting and extinguishing said lamps, a plurality of double-throw master control switches at separated control points and means including said master control switches whereby all of said lamps which are extinguished by their individual control switch means are lighted by actuating one of said master control switches to its alternate position and thereafter said last-mentioned lamps are extinguished by actuating another of said master control switches to its alternate position.

5. An electric lighting system comprising a plurality of lamps for lighting separate rooms or areas, individual control switch means for each of said rooms or areas for lighting or extinguishing said lamps, a group feeder for supplying current to the lamps in a plurality of said rooms or areas and a plurality of group control switches in circuit with said group feeder, the contacts of said group control switches being so connected in series relation that successive operation of said switches alternately energizes and deenergizes the group feeder to light and extinguish the lamps connected thereto.

6. An electric lighting system comprising a plurality of lamps for lighting separate rooms or areas, individual control switch means for each of said rooms or areas for lighting or extinguishing said lamps, a group feeder for supplying current to the lamps in a plurality of said rooms or areas, said group feeder being multiplied to the "off" contacts of the individual control switch means to light the associated lamps which have been turned "off" by any one of said means when the group feeder is energized, a step-by-step switch in said group feeder and means to operate said step-by-step switch for controlling the lamps as a group.

7. An electric lighting system comprising a plurality of lamps for lighting separate rooms or areas, individual control switch means for each of said rooms or areas for lighting or extinguishing said lamps, a source of current, a group feeder for supplying current from said source to the lamps in a plurality of said rooms or areas, said group feeder being multipled to the "off" contacts of the individual control switch means to light the associated lamps which have been turned "off" by any one of said means when the group feeder is energized and means for closing the circuit of said group feeder to its source and for thereafter opening the same automatically after a predetermined lapse of time.

8. An electric lighting system comprising a plurality of lamps for lighting separate rooms or areas, individual control switch means for each of said rooms or areas for lighting or extinguishing said lamps, a group feeder for supplying current to the lamps in a plurality of said rooms or areas, a plurality of master control switches having their contacts in series relation and so interconnected that successive operation of different ones of said switches alternately closes and interrupts a circuit therethrough and means including said master control switches for controlling the energization and deenergization of said group feeder.

9. An electric lighting system comprising a plurality of lamps for lighting separate rooms or areas, individual control switch means for each of said rooms or areas for lighting or extinguishing said lamps, a source of current, a group feeder for supplying current from said source to the lamps in a plurality of said rooms or areas, a plurality of master control switches having their contacts in series relation and so interconnected that successive operation of different ones of said switches alternately closes and interrupts a circuit therethrough and a relay having its winding in series with the contacts of said switches and its contacts in the group feeder to connect and disconnect said feeder from its source.

10. An electric lighting system comprising a plurality of lamps for lighting separate rooms or areas, individual control switch means for each of said rooms or areas for lighting or extinguishing said lamps, a retarded or time-delay switch requiring a substantial period of time to complete its operating cycle and means including said retarded switch for controlling the energization of the lamps turned "off" by the individual control switch means as a group.

11. An electric lighting system comprising a plurality of lamps and individual and group control means therefor providing control of separate lamps or sets of lamps and also concurrent control of the group of lamps, said control means embodying combined individual and group control switches having a common operating member at each of a plurality of control stations, said member being arranged to operate either its individual or group control switch alone whereby the associated lamp or set of lamps and also the group may be controlled from each of said stations by a common operating member.

12. An electric lighting system comprising a plurality of lamps, individual manually operable means to control separate lamps or clusters and automatically operable means to control the lamps which are turned "off" concurrently as a group.

13. An electric lighting system comprising a plurality of lamps and individual and group control means therefor providing control of separate lamps or clusters and also concurrent control of the group of lamps, said group control means embodying a low-voltage control circuit, said group control means also embodying group energizing means controlled by said circuit for concurrent control of the group lamps and a plurality of switches in said control circuit so arranged that successive operation of different switches alternately opens and closes said control circuit to control the group of lamps.

14. An electric lighting system comprising a plurality of lamps and individual and group control means therefor providing control of separate lamps or clusters and also concurrent control of the group of lamps, said group control means embodying a plurality of control stations, a step-by-step switch arranged to close the circuits of the lamps which are turned "off" as a group and means at each of said control stations for operating said step-by-step switch.

15. An electric lighting system comprising a plurality of lamps, individual control means therefor and group control means for concurrently controlling all of said lamps which are turned "off" by their individual control means, the individual control means for one of said lamps including a movable operating member arranged to control said one lamp when moved in one manner and to control said group control means when moved in another manner.

PHILO HOLCOMB, Jr.

CERTIFICATE OF CORRECTION.

Patent No. 2,248,085.                                               July 8, 1941.

PHILO HOLCOMB, JR.

It is hereby certified that error appears in the printed specification of the above numbered patent requiring correction as follows: Page 4, first column, line 19, claim 1, after the word "control" insert --the same as a group by successive manual--; and second column, line 4, claim 6, for "multiplied" read --multipled--; page 5, first column, line 18, claim 13, after "group" insert --of--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.